(12) United States Patent
Chidambaram et al.

(10) Patent No.: US 8,158,399 B2
(45) Date of Patent: Apr. 17, 2012

(54) EXTRACELLULAR BIOREDUCTION

(75) Inventors: Devicharan Chidambaram, Middle Island, NY (US); Arokiasamy J. Francis, Middle Island, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1010 days.

(21) Appl. No.: 12/046,707

(22) Filed: Mar. 12, 2008

(65) Prior Publication Data
US 2008/0241907 A1 Oct. 2, 2008

Related U.S. Application Data

(60) Provisional application No. 60/896,597, filed on Mar. 23, 2007.

(51) Int. Cl.
*C12P 1/04* (2006.01)
(52) U.S. Cl. ....... 435/170; 435/41; 435/252.7; 435/262; 435/262.5; 435/264; 435/281
(58) Field of Classification Search .......... 435/41, 435/170, 252.7, 262, 262.5, 264, 281
See application file for complete search history.

(56) References Cited

U.S. PATENT DOCUMENTS

| | | | |
|---|---|---|---|
| 5,047,152 A | 9/1991 | Francis et al. | |
| 5,292,456 A | 3/1994 | Francis et al. | |
| 5,324,491 A | 6/1994 | Lovley et al. | |
| 5,354,688 A | 10/1994 | Francis et al. | |
| 5,976,719 A * | 11/1999 | Kim et al. | 429/2 |
| 2005/0255345 A1* | 11/2005 | Gerritse et al. | 429/13 |
| 2006/0163154 A1 | 7/2006 | Tay et al. | |

OTHER PUBLICATIONS

Wall, Judy D., et al., "Uranium Reduction", Annu. Rev. Microbiol. 2006, 60:149-66 (published online May 10, 2006).
Hernandez, M. E., et al., "Extracellular electron transfer", CMLS, Cell. Mol. Life Sci. 58:1562-71 (2001).
Stams, Alfons J. M., et al., "Exocellular electron transfer in anaerobic microbial communities", Env. Microbiol., 8(3):371-82 (2006).

* cited by examiner

*Primary Examiner* — Allison Ford
*Assistant Examiner* — Susan E Fernandez
(74) *Attorney, Agent, or Firm* — Dorene M. Price

(57) ABSTRACT

A method for processing environmental or industrial samples to remove, reclaim or otherwise reduce the level of chemical species present in the sample that act as redox active species. The redox active species is kept in a waste chamber and is separated from an aqueous bacterial culture that is held in a culture chamber. The waste chamber and the culture chamber are separated by a porous membrane through which electron transfer can occur but through which the aqueous bacterial culture cannot pass. The redox active species substantially remains in the waste chamber and is in non-contact with the aqueous bacterial culture during the process of removal, reduction or reclamation.

22 Claims, 4 Drawing Sheets

EXTRACELLULAR BIOREDUCTION

CROSS-REFERENCES TO RELATED APPLICATIONS

This application is related to U.S. Provisional Patent Application No. 60/896,597.

The present invention was made with government support under Contract No. DE-AC02-98CH10886 awarded by the U.S. Department of Energy. The United States government has certain rights in the invention.

FIELD OF THE INVENTION

The invention relates to a biological method for non-contact removal or reduction of a redox active species such as, for example, uranium in contaminated materials such as soil, sediment, sludge, wastewater and other waste. More specifically, the invention relates to the use of a bacterial culture of *Clostridium* sp. for the reduction of hexavalent uranium without contacting the bacterial culture with uranium in the contaminated material.

BACKGROUND OF THE INVENTION

Uranium (U) is the forty-ninth most abundant element in the Earth's crust. While there are 17 known isotopes of U, it occurs in the environment primarily as 3 of those known isotopes, namely $^{238}U$ (99.27%), $^{235}U$ (0.72%), and $^{234}U$ (0.005%). Although, the known isotopes of U are radioactive, the greatest ecological and/or environmental concerns are raised by their chemical toxicity rather than radioactivity. Anthropogenic use of U has led to environmental contamination. And, the disposal of electronic devices such as cell phones and computers can contribute to potential environmental contamination as some of these electronic components contain heavy metals, lead, mercury, selenium, cadmium, and hafnium. These types of contaminants may leach from waste sites and cause environmental contamination. Thus, there is a need to dispose of U, as well as other radionuclides, for example, plutonium and thorium and toxic metals such as cobalt, chromium, copper, lead, zinc, nickel and manganese. In order to return a waste site back to a useful condition, it must be decontaminated by removing both the metal and the radionuclide contaminants from the contaminated site. Stabilizing and reducing the mass of radionuclides and toxic metals contained in contaminated materials would facilitate their disposal. As used herein, stabilizing means the treatment of radionuclides and toxic metals so that they are in a stable or insoluble form and lack the ability to be easily converted chemically or biologically to another soluble form. One such method of treatment is bioremediation.

Bioremediation of metals and radionuclides, including U, is distinctly different than biodegradation of toxic organic substances because toxic metals, for example, cannot be degraded. Thus, bioremediation of toxic metals and radionuclides depends on a method of containment that decreases their bioavailability and/or biological access. It is well known that microorganisms can undergo processes that transform and transport radionuclides and toxic metals. Essentially, radionuclides and toxic metals in waste, that are present in soluble form, can be converted into an insoluble form by chemical or microbiological processes. Examples of such microbiological reactions include oxidation/reduction, complexation, change in pH and Eh which affect the valence state of the metal as well as its solubility characteristics, production of sequestering agents, and bioaccumulation. Each of these processes can lead to attenuation or mobilization of metals in the environment.

Bioremediation of U-contaminated waste has been studied over the past 15 years largely because of its chemistry. The oxidation state of U is crucial to its stability, mobility and bioavailability. The oxidized or hexavalent, (VI), state of U is highly soluble and therefore, mobile, while the reduced or tetravalent, (IV), state is relatively insoluble. In waste, U is present primarily as soluble salts of the uranyl ion ($UO_2^{2+}$) When the uranyl ion is reduced from the U(VI) oxidation state to a lower oxidation state such as U(IV), the solubility decreases and it becomes immobilized. A number of bacteria is known to reduce U(VI) and include, for example, *Cellulomonas* sp., *Clostridium* sp., *Desulfosporosinus* spp. *Desulfovibrio* sp., as well as others. Although there is still not a complete understanding of the biochemistry of the process involved using any one bacterium, it has been reported that a common factor among all of the bacteria known to reduce U(VI) is the ability to grow anaerobically where a redox potential sufficiently low for U(VI) reduction would be established.

Microbial reduction of U(VI) was first reported in crude extracts from *Micrococcus lactilyticus* (reclassified as *Veillonella alcalescens*) by assaying the consumption of hydrogen dependent on the presence of U(VI). It was generally believed that abiotic processes were responsible for the production of U(IV) in anaerobic or low redox environments, by processes that included reduction by sulfide, Fe(II), or hydrogen. It was established afterwards that microbial U(IV) reduction was achieved by dissimilatory metal-reducing bacteria by assaying with pure cultures of the Fe(III)-reducing bacteria, *Geobacter metallireducens* strain GS-15 and *Alteromonas putrefaciens* (later *Shewanella putrefaciens*). Conversion of U(VI) to insoluble U(IV) was followed as a decrease in absorption of U(VI) at 424.2 nm with a directly coupled plasma spectrometer after separation of the two U forms by ion exchange chromatography. It was also shown that live cells and an oxidizable substrate were necessary for the U(VI) transformation.

Reductive precipitation of U using microorganisms is presently accepted as a potential strategy for removal of soluble radionuclides and toxic metals to prevent their further migration. In general, current technologies work by stimulation or inoculation of a microorganism directly into the material to be treated. In another method, absorption of contaminant material on to bacterial surfaces (biosorption) has been used. For example, a biological method for removing U from waste (e.g., water), involves adding glycerol-2-phosphate to the U-containing water and then treating the waste water with the microorganism *Citrobacter* sp. This microorganism is reported to have a phosphatase enzyme that releases phosphate from the glycerol-2-phosphate which then forms an insoluble uranium precipitate on the cell surface of the bacteria (biosorption). The enzymatic reaction does not involve uranium and disadvantages to this process are that it is hindered by the presence of carbonate; it precipitates metals, other than U, that form an insoluble phosphate complex; the amount of U that can be sorbed onto the cell surface is limited; and the sorbed U represents a large volume of waste that contains only a small fraction of U and a large quantity of bacterial biomass.

Another conventional method for bioremediation of U is by contacting an iron oxide-metal coprecipitate with a bacterial culture containing *Clostridium* sp. ATCC No. 53464 in a nutrient medium which satisfies the nutritional requirements of the bacterial culture. The treatment of the coprecipitate with the culture of *Clostridium* sp. or its metabolites, solubilizes the ions. The bacterial culture is added to or inoculated or stimulated in the contaminated sludge/water. However, the disadvantage to this method is that the radionuclides and toxic (heavy) metals, because they are toxic to the microbes, have a limited concentration for removal. The microbe can only tolerate up to a critical concentration of about 0.2 mM of U, above which its effect (between about 0.21 mM and 0.42 mM of U) in stabilizing the ions diminishes because concentrations greater than about 0.2 mM are known to be toxic to the bacteria, *Clostridium* sp. It has been reported that a concentration of about 0.42 mM of U is not treated by the bacteria, *Clostridium* sp.

Further it has been reported that *S. oneidensis* strain MR-1, *Shewanella* species (*S. alga* strain BrY), *S. putrefaciens* strain 200 and *Pseudomonas stutzeri* strain demonstrate capabilities in the production of microbially based electron shuttles for electron transfer. However, these strains are gram negative bacteria which have thin cell wall layers, and therefore, it is not surprising that they have those capabilities. Thus, there remains a need to further expand and enhance the methods of bioremediation. To this end, the present invention relates to a method of bioremediation capable of using microorganisms for treating toxic metals.

SUMMARY OF THE INVENTION

The present invention relates to a method of changing the valence state of redox active species by establishing an aqueous bacterial culture containing gram positive bacteria in a culture chamber and holding the redox active species present in a contaminated mass in a waste chamber. The culture chamber and the waste chamber are separated from one another by a porous membrane through which electron transfer can occur. However, the porous membrane is impenetrable by the aqueous bacterial culture and the redox active species substantially remains in the waste chamber. Further, the redox active species is not a nutrient source to the aqueous bacterial culture.

The present invention also includes a method of bioreducing and stabilizing redox active species, and of reclaiming redox active species contained in a contaminated mass by these steps. Further, the methods of the present invention include stabilizing redox active species that are present in a contaminated waste by changing the valence state of the redox active species at room temperature with an aqueous bacterial culture containing *Clostridium* sp. without contact between the waste and the aqueous gram positive bacterial culture. Additionally, the present invention includes a method of changing the valence state of a redox active species such as uranium or a precious metal contained in a contaminated mass with aqueous gram positive bacterial culture.

DETAILED DESCRIPTION OF THE INVENTION

Figure 1:
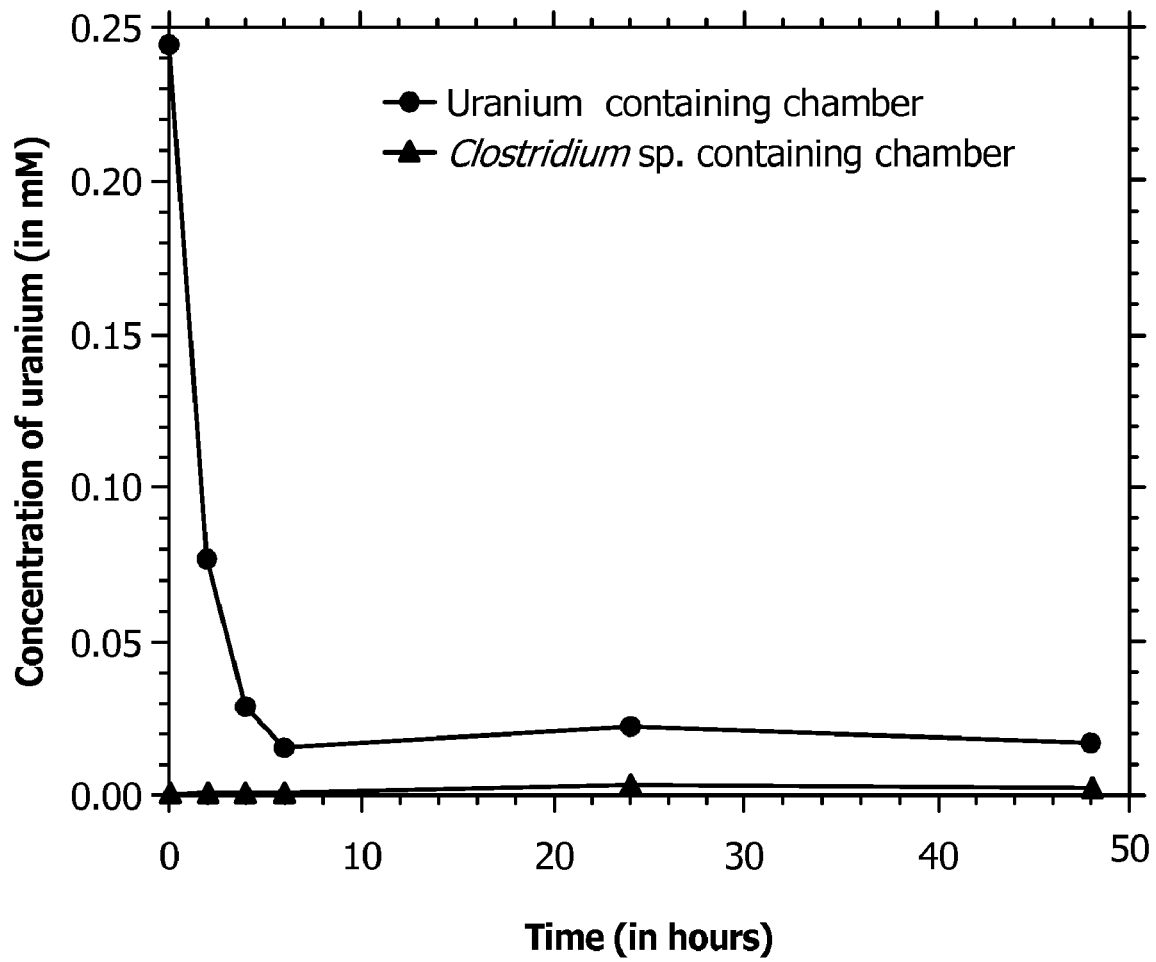
FIG. 1 depicts a line graph showing the bioreduction of U without contacting the anaerobic microbe over time (in hours) using a 0.2 micron porous membrane.

The invention relates to a method of changing the valence state of redox active species, for example uranium (U), toxic metals, radioactive metals, or precious metals, present in a contaminated waste by establishing an aqueous bacterial culture in a culture chamber, holding the contaminated mass containing the redox active species in a waste chamber, and separating the culture chamber from the waste chamber with a porous membrane. The separation between the culture chamber and the waste chamber is such that the porous membrane substantially separates the aqueous gram positive bacterial culture from the redox active species on the other side of the porous membrane; yet, electron transfer can occur between the two chambers. Further, the redox active species is not a nutrient source to the aqueous bacterial culture. Thus, the aqueous gram positive bacterial culture and the redox active species are in non-contact with one another in the waste chamber.

While not intending to be bound by any particular theory, it is believed that a metabolite passes through the membrane and is an extracellular soluble compound capable of redox active species reduction. Thus, the aqueous bacterial culture and the redox active species are substantially isolated from each other and removal of the redox active species does not require that the aqueous bacterial culture be in contact with the redox active species. The redox active species and the aqueous bacterial culture remain in a non-contact state in the waste chamber during the process of changing the valence state of redox active species. Therefore, the present invention is also an extracellular or exocellular based mechanism for electron transfer. The terms, extracellular or exocellular based mechanism, as they are used in the present invention are interchangeable, and are defined to mean a mechanism that occurs outside of the microbiological or bacterial cell (e.g., ex-situ). The terms do not include a mechanism that occurs on the surface of the cell and do not include intracellular mechanisms where the process occurs within the plasma membrane of, for example, a gram negative bacteria.

The change in the valence state of redox active species found in a mass of waste results in the bioreduction of the redox active species, for example, precious metals, radioactive metals or radionuclides, such as U, and/or toxic metals.

In another embodiment of the present invention, redox active species such as precious or valuable metals are reclaimed, bioreduced, or stabilized by the process of changing the valence state of redox active species. The precious or valuable metals can then be recycled for further use. Examples of precious metals include but are not limited to cadmium, cobalt, chromium, copper, nickel, lead, mercury, selenium, hafnium, gold, silver, platinum, or zinc.

The present invention is particularly directed to the treatment of a contaminated mass, or effluent, the definition of which, as used in the present specification includes, but is not limited to, solid waste, polluted soil, surface water, ground water, industrial stream and the like.

The aqueous bacterial culture can be any bacteria or microbe capable of changing the valence state of the redox active species without contacting the aqueous bacterial culture with the waste mass. Preferably, the aqueous bacterial culture is an anaerobic microbe. In other words, it can grow under anaerobic conditions. Further, the anaerobic microbe is capable of changing the valence state of the redox active species in the absence of, for example, an added electron acceptor such as sulfate or Fe(III), e.g., iron citrate or a redox mediator species. It is believed that the microbe is capable of creating its own electron acceptor.

Preferably, the aqueous bacterial culture is a gram positive bacteria. The Gram staining process is used to distinguish between gram-negative and gram-positive bacteria and distinguishes between two fundamentally different types of cell walls. The gram-positive bacteria are encased in a plasma membrane covered with a thick wall of peptidoglycan; whereas, gram-negative bacteria are encased in a triple-layer, including a peptidoglycan layer and an outermost layer that contains lipopolysaccharide. The gram-positive bacteria has a thicker peptidoglycan layer than the gram-negative bacteria.

More preferably, the aqueous bacterial culture is an anaerobic gram positive microbe. More preferably still, the anaerobic gram positive microbe is from the *Clostridium* genus referred to as *Clostridium* sp. and includes for example, *Clostridium* sp. BFG1 designated ATCC No. 55102 or *Clostridium* sp. ATCC No. 53464 each of which is known and readily available as described in U.S. Pat. Nos. 5,047,152 and 5,354,688, respectively and both of which are incorporated herein by reference.

The aqueous bacterial culture is established in a culture chamber. The culture chamber preferably has an input channel and an output channel. On the one hand, the input channel permits the flow of media ingredients to supplement the continued maintenance of the culture. While on the other hand, the output channel permits the removal of media ingredients. The culture is maintained, e.g., continuously or periodically, at a certain optical density, preferably between 0.6 and 0.9 OD as measured at 600 nm to optimize the production of the aqueous bacterial culture, and consequently, the production of an extracellular compound capable of metal reduction, i.e., a mobile molecule herein referred to as a metabolite. The *Clostridia* can be grown in any known medium, such as for example, Reinforced Clostridial Medium (RCM) or the *Clostridium* sp. ATCC 53464 culture can be grown using a glucose-ammonium-glycerol phosphate growth medium (glucose, ammonium chloride, glycerol phosphate, magnesium sulfate, calcium chloride, iron sulfate, peptone, yeast extract and distilled water.) The glucose-ammonium-glycerol phosphate growth medium has a pH of about 6.8 which can be adjusted using 1M sodium hydroxide.

It is recognized in the art that an alternative to direct-contact pathways, i.e., where the bacteria is in contact with a redox active species, is a pathway that involves a mobile small molecule (the metabolite herein) capable of undergoing redox cycling (or in other words an electron shuttle). The metabolite serves as the terminal electron acceptor and, once reduced, can itself transfer electrons to the iron oxides after which it becomes reoxidized. This mechanism is understood in the art to be an indirect reduction process. Theoretically, it is also believed in the art that a metabolite is capable of cycling thousands of times, and is thus, capable of having a significant effect on the turnover of the terminal oxidant (e.g., the iron). There are two types of electron shuttles recognized in the art, namely, the exogenous shuttle and the endogenous shuttle. The exogenous shuttle is one that is present in the environment or is added (i.e., not microbially produced) to stimulate electron shuttling; and, the endogenous shuttle is one that is microbially produced.

In addition to substantial non-contact bioreduction of the redox active species, it has been surprisingly found with the present invention that the mechanism known as indirect reduction process (where the unencapsulated bacteria is not in contact with the redox active species) is effective not only with gram negative bacteria but can occur with the gram positive bacteria. Because the gram positive bacteria possess a thick wall of peptidoglycan and does not possess an outermost layer of lipopolysaccharide, it was not expected to produce and release an endogenous shuttle capable of electron transfer. Further, unexpectedly, electron transfer occurs endogenously across a porous membrane. Further still, the bioreduction of the present invention has been found to occur not only with iron, which is a nutrient to bacteria for survival, but also with other redox active species that are not nutrient sources for the bacteria. This has not heretofore been known.

It is known that the *Clostridium* microbe, in the presence of metabolizable nutrients, such as carbon and nitrogen, causes changes in the valence states of the radionuclides and toxic metals in the mass of waste by adding the microbe to the waste containing the radionuclide or toxic metal (i.e., direct contact). In this case, the microbe contacts the waste containing the radionuclide or toxic metal and the microbial activity causes release of such radionuclides and toxic metals into the medium. For example, metals and radionuclides associated with the carbonate fraction are solubilized along with the carbonate during microbial treatment due to indirect action, i.e., production of organic acid metabolites and lowering the pH of the medium. Metals and radionuclides initially associated with the iron oxide fraction are solubilized due to direct microbial enzymatic reduction of iron. The anaerobic microbe seeks energy by metabolizing the metabolizable nutrients and at the same time causes the change in the valence states of redox active species it contacts. The released metals and radionuclides are then reduced to lower oxidation states, become insoluble, and precipitate out of the solution. However, it has not heretofore been known to change the valence state of a radionuclide or toxic metal without contacting the aqueous gram positive bacterial culture with the mass of waste containing the radionuclide or toxic metal.

It has also been known to encapsulate bacteria in the process of manipulating the redox potential of an aqueous or semi-aqueous environment. However, in using such a method the bacteria is still contacted with the waste in order to achieve the manipulation of the redox potential or utilizes a reactive mediator species as a liaison between the microorganism and the waste.

The porous membrane of the present invention separates the culture chamber and the waste chamber. The porous membrane, preferably, is replaceable and can be held in place by a holder. The porous membrane can have various pore sizes. A desired pore size of the porous membrane is selected based on the type and nature of the desired redox active species (i.e., contaminant) to be removed. However, the pore size is not less than about 0.01 micron and not greater than about 0.45 microns to ensure the bacteria does not cross over into the waste chamber (this is the largest size porous membrane used to filter bacteria in general and including *Clostridium* sp.). Preferably, the porous membrane is about 0.2 micron in pore size and is available commercially as a Polycarbonate membrane from GE Osmonics Water and Process Technologies, Minnetonka, Minn. The porous membrane prevents the waste chamber from becoming contaminated with the bacteria. When the bacteria, in the prior art, contacts the mass of waste, the chamber holding the bacteria can become contaminated. However, with the present invention, the culture chamber becomes substantially less contaminated as compared with the direct contact reduction process. While not intending to be bound by any particular theory, this is believed to be partly due to the generation of gases by the aqueous bacterial culture which creates a light positive pressure in the culture chamber. The use of for example, cotton or a sterile cap, as a plug for the culture chamber provides a vent for most of the gases that are produced and that would otherwise build up pressure to about 30 to 35 psi in a closed system (i.e., a system with a tight seal). As a result, nonetheless, the gradient of pressure moves out from the culture chamber and not into the culture chamber. The porous membrane is substantially impervious to the redox active species such that the redox active species substantially remains in the waste chamber and remains in non-contact with the aqueous gram positive bacterial culture. The term "remains in non-contact" as used herein is defined to mean that less than about 1.5% of the total contaminants as redox active species is capable of passing to the culture chamber during the process of changing the valence state (reducing) of the redox active species The redox active species can be toxic metals, radioactive metals or precious metals which may be separated from the mass of waste by rendering them insoluble without contacting the aqueous bacterial culture. The term redox active species as it used in the present specification includes all ionic species of metal, or any compound, that can undergo reduction reaction. Redox active species which may be separated from the mass of waste include, but are not limited to, alkali metals, alkaline-earth metals, transition metals, heavy metals, rare earth metals, metals of the lanthanide and actinide series and transuranic metals. Representative metals include, for example, Transition metals: scandium, titanium, vanadium, chromium, manganese, iron, cobalt, nickel, copper, zinc, yttrium, zirconium, niobium, molybdenum, technetium, hafnium, ruthenium, rhodium, palladium, gold, cadmium, iridium, platinum, silver, mercury; Actinides: thorium, protactinium, uranium, neptunium, plutonium, americium, curium, berkelium, californium, einsteinium, mendelevium, nobelium, and lawrencium, including the transuranic elements which are elements having a higher atomic number than U.

The redox active species is one that is not a nutrient source for the gram positive bacteria. In other words, the aqueous bacterial culture has a microbial metabolism that is resistant to the concentration of the redox active species in the contaminated mass. Therefore, the redox active species of the present invention is not iron. More preferably, the redox active species is U, Tc (technetium) and Pu (plutonium) and Cr (chromium) and precious metals such as for example, cadmium, cobalt, chromium, copper, nickel, lead, mercury, selenium, hafnium, or zinc. Most preferably, the redox active species is uranium. Uranyl nitrate hexahydrate can be obtained from Sigma Aldrich (St. Louis, Mo.) or from BDH Chemicals, U.K. for the purpose of demonstrating the capabilities of the present invention. The method of the present invention is particularly advantageous in removing transition metals, actinides and transuranic elements and reclaiming precious metals.

The redox active species are present in a mass of waste which collectively are held in a waste chamber containing the growth medium. The process of the present invention can be carried out using sterile techniques. The waste chamber is periodically tested for microbial contamination and shows no contamination. The waste chamber can be arranged in many ways. In one example of the arrangement of the waste chamber, it has two output channels and an input channel. The contaminated water or effluent or mass of waste is fed into the waste chamber through the input channel. The first of the two output channels releases the treated water or effluent or mass of waste and the second of the two output channels facilitates the removal of the precipitated waste of the redox active species. After the valence state of the redox active species is reduced, the redox active species precipitates out and settles down to the bottom of the waste chamber. Therefore, the second of the two output channels is located at the bottom of the waste chamber and below the first output channel. Thus, the first of the two output channels is located above the second of the two output channels of the waste chamber and below the input channel. The waste chamber can also be arranged with an input channel and a membrane through which the treated water or effluent or mass of waste can pass through but which the redox active species as precipitated waste cannot. The redox active species is removed by scraping it off of the membrane or discarding the membrane and replacing it with a new membrane.

In another embodiment of the present invention, the aqueous bacterial culture and the redox active species are arranged in a continuous parallel/counter flow treatment design. The culture chamber can be divided into two sectional chambers which sandwich the waste chamber or the waste chamber can divided into two chambers which sandwich the culture chamber.

Using the methods of the present invention, substantially any concentration of the redox active species can be treated without experiencing a deleterious effect on the bacterial metabolism. Preferably, the concentration is greater than about 0.2 mM; and more preferably greater than about 0.5 mM; and more preferably still between about 0.2 mM and about 5 mM. A particular benefit of the present invention is that the redox active species can be removed without any biomass, and therefore, no further treatment is required for its removal. Further, sequentially added significant quantities of redox active species can be treated and removed from the waste mass to, for example treat as effluents.

Another benefit of the present invention is that the bioreduction process can be carried out at room temperature as the electron transfer occurs at room temperature. The temperature is preferably 20-40° C.; and more preferably 22-28° C. Previous systems were carried out at elevated temperatures.

Acceleration of the process can be achieved by addition of electron carrier and/or electrochemical methods using implanted electrode materials polarized at a certain potential for enhanced rate of removal of contaminants. Electrochemical methods and/or addition of synthetic or natural electron mediating compounds such as AQDS enhance the reduction rate of the present invention.

EXAMPLES

I. Preparation of the Bacterial Culture

Composition of Medium for *Clostridium* sp. ATCC 53464 culture. Glucose-ammonium-glycerol phosphate growth medium:

| | |
|---|---|
| Glucose | 5.0 g |
| NH4Cl | 0.5 g |
| Glycerol Phosphate | 0.3 g |
| MgSO4•7H2O | 0.2 g |
| CaCl2•2H2O | 0.5 g |
| FeSO4•7H2O | 2.8 mg |
| Peptone | 0.1 g |
| Yeast extract | 0.1 g |
| Distilled H2O | 1 liter |
| pH | 6.8 |

The pH is adjusted using 1M Na OH.

Pre-reduce growth medium by boiling for 15 minutes while purging with filtered ultra-high-purity (UHP) nitrogen gas. Cool and transfer the growth medium to an anaerobic glove box (Coy Laboratory products, MI) and dispense 120 ml aliquots of the growth medium into eight 150 ml serum bottles. Seal the bottles with butyl rubber stoppers and Al crimps, and autoclave.

Conduct all manipulations of the samples inside an anaerobic glove chamber filled with nitrogen containing trace amounts of hydrogen; and, conduct experiment in a sterile electrochemical cell having two compartments (each compartment is a chamber that is a 100 ml Pyrex Corning bottle capable of holding about 100 ml in volume and each chamber is sealed using a 'cotton plug', to prevent contamination from the exterior) separated by a 0.2 micron porous membrane. The two compartments, each containing the glucose-ammonium-glycerol phosphate growth medium, are capped using a cotton plug. Label one compartment on one side as "inoculated" (culture chamber) and the other compartment on the other side as "un-inoculated" (waste chamber). From one of the labeled bottles from above, transfer 59 ml of autoclaved media to the "inoculated" compartment, and 61 ml of the autoclaved media to the "un-inoculated" compartment. Add 2 ml of 18 to 24 hour old culture of *Clostridium* sp. (~O.D.$_{600\ nm}$=0.6) to the "inoculated" compartment and allow the culture to grow at 26° C.

II. Extracellular Bioreduction Contemporaneous with Growth of Culture/Bacteria does not Pass Through the Porous Membrane At the end of log phase growth in I. above, add uranyl nitrate from a stock solution to the "un-inoculated" compartment to result in a uranyl concentration of 0.25 mM. Stock solution is prepared using uranyl nitrate, $UO_2(NO_3)_2$, obtained in hexahydrate form from BDH chemicals, U.K. 0.5M stock solution is prepared by adding 251 grams of Uranyl nitrate hexahydrate to deionized (18.2 MΩ) water to bring up the volume to 1000 ml. Growth time is about 18 hours and has an optical density of 0.6 at 600 nm as measured by spectrophotometry.

After addition of uranyl nitrate hexahydrate to 'un-inoculated' chamber, measure the concentration of U at various times in hours (initial, 2, 4, 6, 24, and 48 hours) using kinetic phosphorescence analysis. As shown in FIG. 1, U is bioreduced, 94% reduced in 6 hours, and little or no U is detected in "inoculated" chamber. This indicates that the U added in the "un-inoculated" chamber is rapidly reduced and precipitates out of solution, and U is not present in the "inoculated" chamber. Epifluorescence microscopy results of the "un-inoculated" chamber demonstrate that there is no bacteria present. In addition, no bacterial growth is observed in the waste chamber.

III. Extracellular Bioreduction after Growth of Culture

Figure 2:
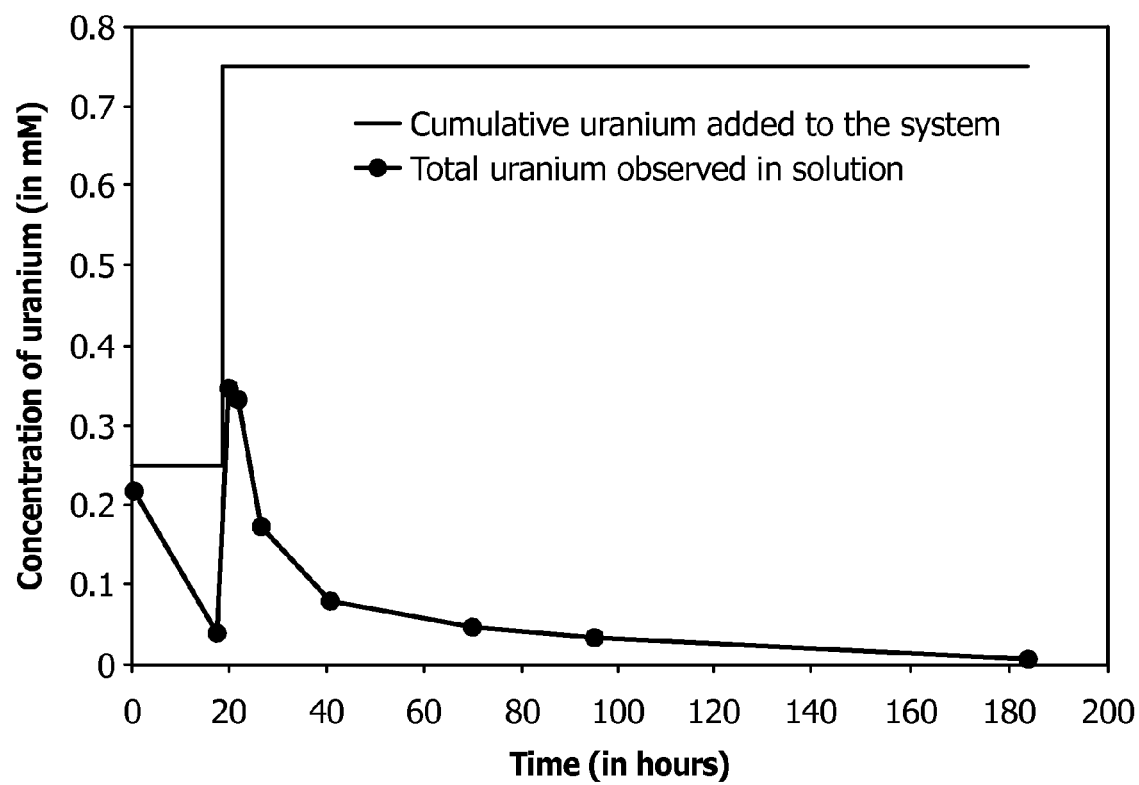
FIG. 2 depicts a line graph comparing cumulative uranium added in one step after initial addition to the waste chamber of the two compartmental system of the present invention and the concentration of the total uranium observed in solution (soluble uranium) in the waste chamber over a time period of more than 180 hours using a 0.2 micron porous membrane.

At the time of inoculation in I. above, add uranyl nitrate from a stock solution to the "un-inoculated" compartment to result in a uranyl concentration of 0.25 mM (initial addition). Stock solution is prepared as in II. above. Supplementally, add uranyl nitrate at the end of log phase growth to the "un-inoculated" compartment from the stock solution to result in a cumulative concentration of 0.75 mM (one step addition). Measure the concentration of U at various times in hours (initial, 2, 18, 20, 22, 27, 41, 70, 95 and 184 hours) using kinetic phosphorescence analysis. As shown in FIG. 2, U is bioreduced, 84.2% U(VI) reduction at 18 hours and 99.2% U(IV) reduction at 184 hours. The U is observed as a precipitate out of solution. Further, it is shown that addition of U at the time of inoculation does not inhibit the reduction of the U in the "un-inoculated" compartment and does not inhibit the growth of the bacteria in the inoculated compartment because it is not in contact.

IV. Occurrence of Electron Transfer with Porous Membrane

Figure 3:
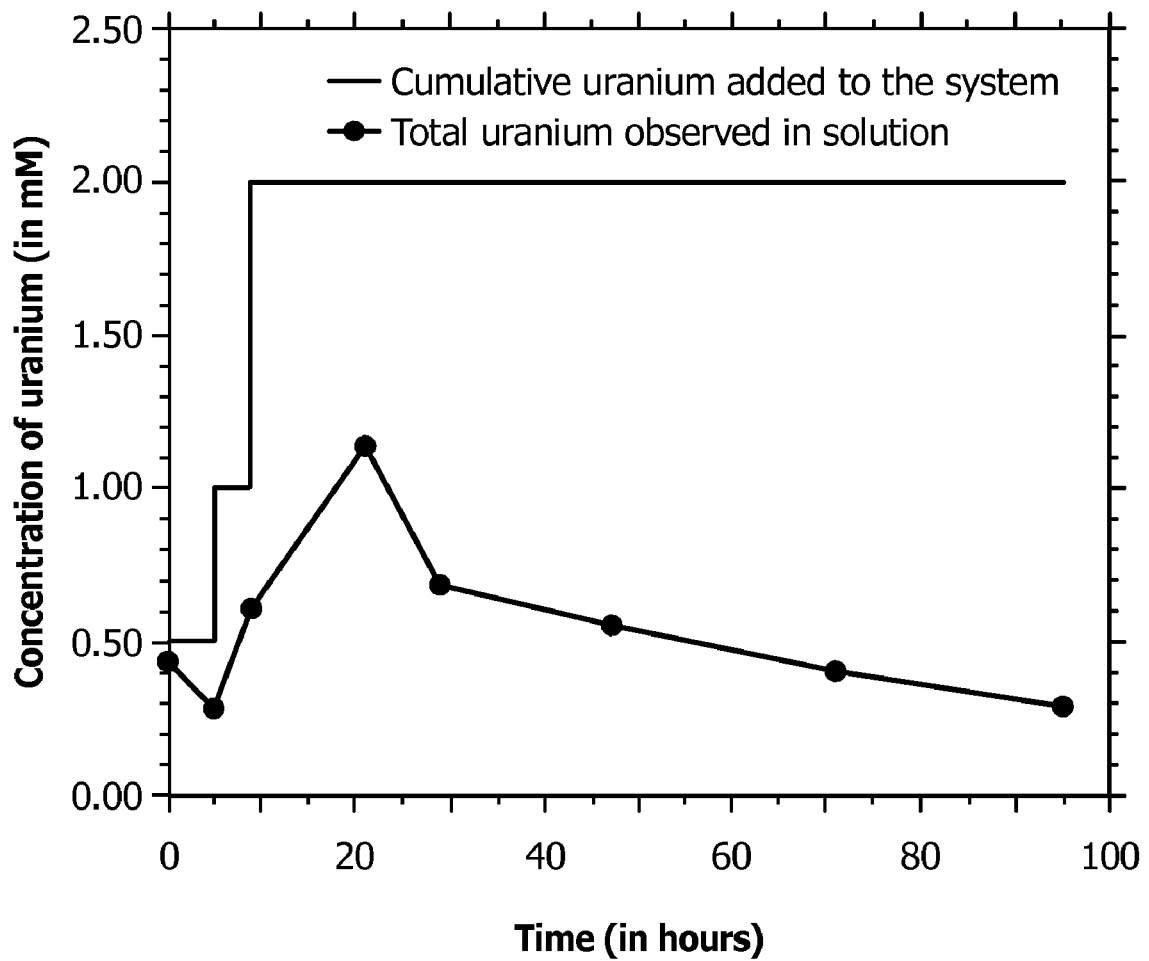
FIG. 3 depicts a line graph comparing cumulative uranium added in two steps after initial addition to the system of the present invention and the total uranium observed in solution (soluble uranium) in the waste chamber over a time period of over 90 hours using a 0.2 micron porous membrane.

At the end of log phase growth in I. above (using 0.2 micron porous membrane), add successive additions of uranyl nitrate from a stock solution (0.5 mM as the initial addition, 0.5 mM as the one step addition, and 1.0 mM as the two step addition) to the "un-inoculated" compartment to result in a cumulative uranyl concentration added of 2 mM. Stock solution is prepared as in II. above. Growth time is about 19 hours and has an optical density of 0.6 at 600 nm as measured by spectrophotometry. Measure the concentration of U at various times in hours (initial, 5, 9, 21, 29, 47, 71 and 95 hours) using kinetic phosphorescence analysis. As shown in FIG. 3, the U added in the "un-inoculated" chamber is bioreduced 85.6% at 95 hours. The U is observed as a precipitate out of solution and is green in color. And, the 0.2 micron membrane does not inhibit the reduction of uranyl species in the "un-inoculated" chamber".

Set up a second sterile electrochemical cell having two compartments separated by a 0.01 micron porous membrane. The two compartments are capped using a cotton plug. Label one compartment on one side as "inoculated (0.01)" (culture chamber) and the other compartment on the other side as "un-inoculated (0.01)" (waste chamber). Transfer 59 ml of autoclaved media to the "inoculated (0.01)" compartment, and 61 ml of the autoclaved media to the "un-inoculated (0.01)" compartment. Add 2 ml of 20 to 24 hour old culture of *Clostridium* sp. to the "inoculated (0.01)" compartment and allow the culture to grow at 26° C.

Figure 4:
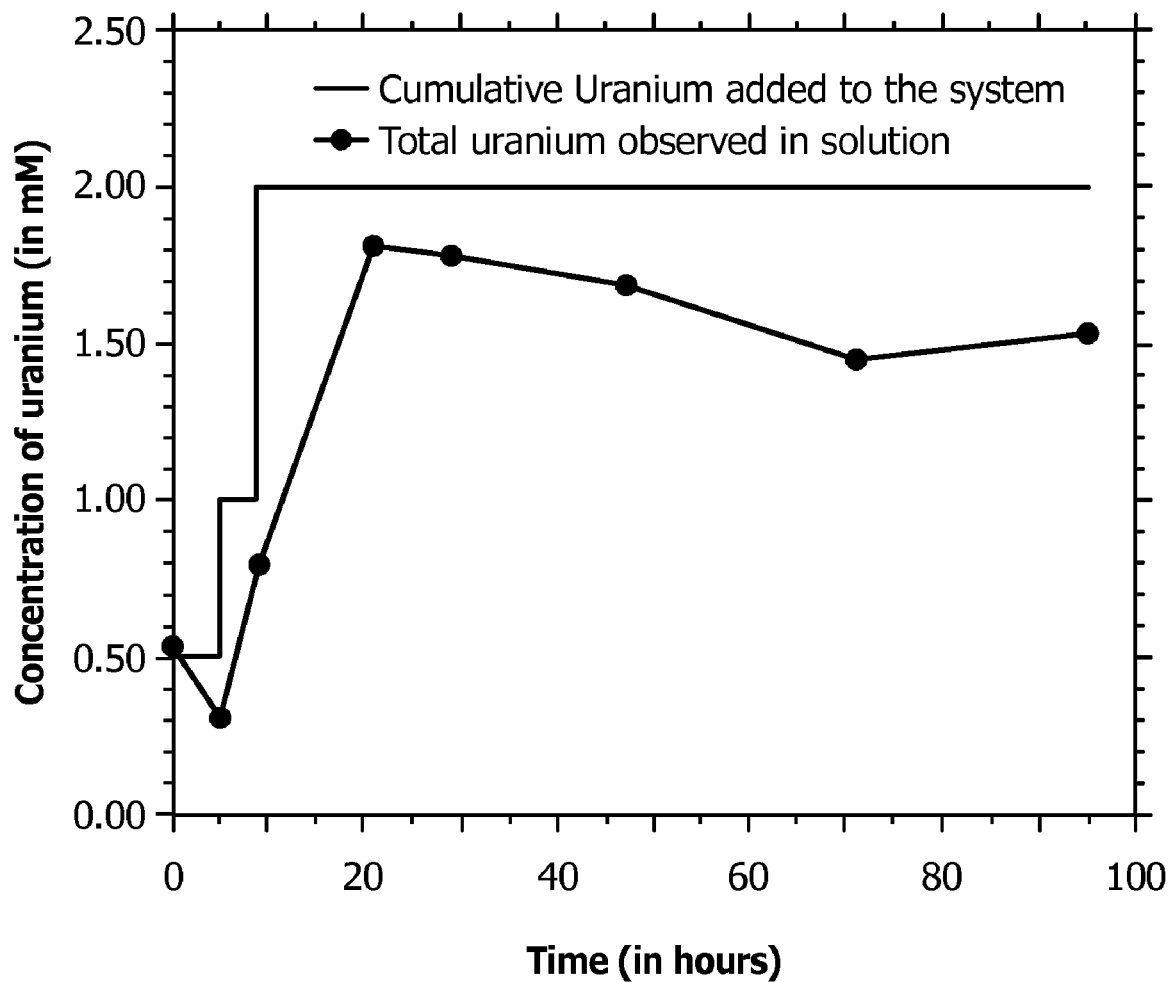
FIG. 4 depicts a line graph comparing cumulative uranium added in two steps after initial addition to the system of the present invention and the total uranium observed in solution (soluble uranium) in the waste chamber over a time period of over 90 hours using 0.01 micron porous membrane.

At the end of the log phase growth, add successive additions of uranyl nitrate from a stock solution (0.5 mM as the initial addition, 0.5 mM as the one step addition, and 1.0 mM as the two step addition) to the "un-inoculated (0.01)" compartment to result in a uranyl concentration of 2 mM. Stock solution was prepared as in II. above. Growth time is about 19 hours and has an optical density of 0.6 at 600 nm as measured by spectrophotometry. Measure the concentration of U at various times in hours (initial, 5, 9, 21, 29, 47, 71 and 95 hours) using kinetic phosphorescence analysis. As shown in FIG. 4, unreduced U is still observed in solution, 76.5% of $U^{6+}$ at 95 hours, and shows that the 0.01 micron porous membrane inhibits the bioreduction of U in the "un-inoculated (0.01)" compartment. The remainder of the 2 mM unreduced uranium that was added (100%−76.5%=23.5%) is not found using kinetic phosphorescence because this concentration exceeds the solubility limit under the conditions of the experiment and is precipitated as uranium (VI). The precipitated U(VI) is observed as yellow in color indicating that U remains oxidized as it was originally added (FIG. 4); whereas precipitated reduced U(IV) is green in color (FIG. 3). Therefore, the remainder of the 2 mM uranium is also not bioreduced.

Although the invention has been described relative to exemplary preferred embodiments thereof, it will be understood by those skilled in the art that variations and modifications of these embodiments can be effected without departing from the scope and spirit of the invention.

The invention claimed is:

1. A method of changing the valence state of a redox active species present in a contaminated mass which comprises the steps of:
   a) providing a culture chamber and a waste chamber wherein the culture chamber is separated from the waste chamber by a porous membrane, wherein an aqueous bacterial culture is held in the culture chamber, and wherein a contaminated mass comprising redox active species is held in the waste chamber, and b) changing the valence state of the redox active species via an electron transfer across the porous membrane and between the culture chamber and the waste chamber wherein the aqueous bacterial culture cannot pass through the porous membrane, and wherein the redox active species substantially remains present in the waste chamber and is not a nutrient source to the aqueous bacterial culture.

2. The method of claim 1 wherein the aqueous bacterial culture and the redox active species are in non-contact with each other.

3. The method of claim 1 wherein the electron transfer occurs at room temperature.

4. The method of claim 1 wherein step a) comprises growing the aqueous bacterial culture under anaerobic conditions.

5. The method of claim 1 wherein the porous membrane has a pore size greater than 0.01 micron and not greater than about 0.45 micron.

6. The method of claim 1 wherein the concentration of the redox active species in the contaminated mass is greater than about 0.2 mM.

7. The method of claim 1 wherein the concentration of the redox active species in the contaminated mass is greater than about 0.5 mM.

8. The method of claim 1 wherein the concentration of the redox active species in the contaminated mass is between about 0.2 mM and about 5 mM.

9. The method of claim 1 wherein the redox active species is selected from the group consisting of toxic metals, radioactive metals and precious metals.

10. The method of claim 1 wherein the redox active species is selected from the group consisting of uranium, technetium, plutonium, cadmium, cobalt, chromium, copper, nickel, lead, mercury, selenium, hafnium, and zinc.

11. The method of claim 1 wherein the aqueous bacterial culture has a microbial metabolism that is resistant to the concentration of the redox active species in the contaminated mass.

12. The method of claim 1 wherein the aqueous bacterial culture is capable of changing the valence state of the redox active species.

13. The method of claim 1 wherein the aqueous bacterial culture is a gram positive bacterial culture.

14. The method of claim 1 wherein the aqueous bacterial culture is a species of the genus *Clostridium*.

15. The method of claim 1 wherein the aqueous bacterial culture has a thick wall of peptidoglycan.

16. A method of bioreducing a redox active species contained in a contaminated mass by changing the valence state of the redox active species comprising the steps of a) providing a culture chamber and a waste chamber wherein the culture chamber is separated from the waste chamber by a porous membrane, wherein an aqueous bacterial culture is held in the culture chamber, and wherein the redox active species present in the contaminated mass is held in the waste chamber, and, b) changing the valence state of the redox active species via an electron transfer across the porous membrane wherein the aqueous bacterial culture cannot pass through the porous membrane, and wherein the redox active species substantially remains present in the waste chamber and is not a nutrient source to the aqueous bacterial culture.

17. A method of reclaiming redox active species from a contaminated or industrial mass by changing the valence state of the redox active species comprising the steps of a) providing a culture chamber and a waste chamber wherein the culture chamber is separated from the waste chamber by a porous membrane, wherein an aqueous bacterial culture is held in the culture chamber, and wherein the redox active species present in the contaminated or industrial mass is held in the waste chamber, and, b) changing the valence state of the redox active species via an electron transfer across the porous membrane wherein the aqueous bacterial culture cannot pass through the porous membrane, and wherein the redox active species substantially remains present in the waste chamber and is not a nutrient source to the aqueous bacterial culture.

18. The method of claim 17 wherein the redox active species is selected from the group consisting of cadmium, cobalt, chromium, copper, nickel, lead, mercury, selenium, hafnium, gold, silver, platinum, and zinc.

19. A method of changing the valence state of uranium or a precious metal present in a contaminated mass which comprises the steps of a) providing a culture chamber and a waste chamber wherein the culture chamber is separated from the waste chamber by a porous membrane, wherein an aqueous gram positive bacterial culture is held in a culture chamber, and wherein the uranium or precious metal present in the contaminated mass is held in the waste chamber, and, b) changing the valence state of the uranium or precious metal via an electron transfer through the porous membrane and wherein aqueous bacterial culture cannot pass through the porous membrane, and wherein the uranium or the precious metal substantially remains present in the waste chamber.

20. The method of claim 19 wherein the aqueous bacterial culture comprises a gram positive bacteria that has a thick wall of peptidoglycan.

21. A method of stabilizing redox active species contained in a contaminated waste which comprises the steps of:

a) providing (i) a culture chamber holding an aqueous bacterial culture containing a species of the genus *Clostridium*, and (ii) a waste chamber holding a contaminated mass comprising redox active species, wherein the culture chamber is separated from the waste chamber by a porous membrane and the aqueous bacterial culture is not in contact with the redox active species, and b) changing the valence state of the redox active species at room temperature via an electron transfer across the porous membrane and between the culture chamber and the waste chamber, thereby stabilizing the redox active species, wherein the redox active species substantially remains present in the waste chamber and is not a nutrient source to the species of the genus *Clostridium*.

22. The method of claim 21 wherein the pore size of the porous membrane is between about 0.01 micron and about 0.45 micron.

* * * * *